(12) United States Patent
Noguchi (10) Patent No.: US 7,894,102 B2
(45) Date of Patent: Feb. 22, 2011

(54) IMAGE PROCESSING APPARATUS FOR EXTRACTING CODE DATA FROM SCANNED IMAGE AND CONTROL METHOD THEREOF

(75) Inventor: Kazuyoshi Noguchi, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1160 days.

(21) Appl. No.: 11/583,786

(22) Filed: Oct. 20, 2006

(65) Prior Publication Data
US 2007/0188817 A1 Aug. 16, 2007

(30) Foreign Application Priority Data

Feb. 13, 2006 (JP) ............................... 2006-035153
Feb. 13, 2006 (JP) ............................... 2006-035446

(51) Int. Cl.
*H04N 1/40* (2006.01)

(52) U.S. Cl. ................... 358/3.28; 358/2.1; 713/176; 382/182

(58) Field of Classification Search .............. 358/3.28; 713/176; 382/182
See application file for complete search history.

(56) References Cited

U.S. PATENT DOCUMENTS

| 2002/0015525 | A1* | 2/2002 | Fujiwara | ................... | 382/182 |
| 2004/0148507 | A1* | 7/2004 | Iwamura et al. | ............. | 713/176 |

FOREIGN PATENT DOCUMENTS

| JP | 5-130376 | A | 5/1993 |
| JP | 7-273975 | | 10/1995 |
| JP | 8-088756 | A | 4/1996 |
| JP | 9-200513 | A | 7/1997 |
| JP | 11-266366 | A | 9/1999 |
| JP | 11-317860 | A | 11/1999 |
| JP | 2002-057895 | A | 2/2002 |
| JP | 2004-228897 | | 8/2004 |
| JP | 2004-282356 | A | 10/2004 |
| JP | 2005-012623 | A | 1/2005 |
| JP | 2005-151126 | A | 6/2005 |
| JP | 2005-199486 | A | 7/2005 |
| JP | 2005-354141 | | 12/2005 |
| JP | 2006-109070 | A | 4/2006 |

OTHER PUBLICATIONS

Japanese Office Action dated Aug. 7, 2007, directed to counterpart JP Application No. 2006-035153 (7 pages).
Japanese Office Action dated Aug. 7, 2007, directed to counterpart JP Application No. 2006-035446 (5 pages).
Japanese Decision to Grant Patent mailed Feb. 5, 2008, directed to counterpart JP application No. 2006-035446; 6 pages.

\* cited by examiner

*Primary Examiner*—Twyler L Haskins
*Assistant Examiner*—Michael Burleson
(74) *Attorney, Agent, or Firm*—Morrison & Foerster LLP (57) ABSTRACT

An image processing apparatus scans an image of a document to thereby create image data, and extracts specific code data from the created image data. If the specific code data is successfully extracted, pattern data corresponding to the specific code data is deleted from the created image data. Further, pattern data corresponding to the specific code data is embedded into the image data.

10 Claims, 9 Drawing Sheets

DATA 0

FIG.3B

DATA 1

FIG.4

(FILTER A1)

FIG.5
(FILTER A2)

FIG.6
(FILTER A3)

IMAGE PROCESSING APPARATUS FOR EXTRACTING CODE DATA FROM SCANNED IMAGE AND CONTROL METHOD THEREOF

This application is based on Japanese Patent Applications Nos. 2006-035153 and 2006-035446 filed both on Feb. 13, 2006 with the Japan Patent Office, the entire content of which is hereby incorporated by reference.

BACKGROUND OF THE INVENTION

1. Field of the Invention

The present invention relates to an image processing apparatus. More particularly, the present invention relates to an image processing apparatus for executing processing based on whether or not scanned image data contains a predetermined pattern, and a control method thereof 2. Description of the Related Art In recent years, there have been remarkably improved an image processing technique and an image forming technique.

In response to the aforementioned circumstances, there has been practically used an image forming apparatus having a function of identifying special documents such as bills and securities to thereby prohibit illegal copy of such documents.

In addition, there have been disclosed various techniques for prohibiting illegal copy of papers and authors utilized in an office.

For example, Japanese Laid-Open Patent Publication No. 07-273975 discloses the following technique. That is, a digital copying machine determines whether or not image data scanned by a scanner contains a confidential numbering pattern. If the image data contains the confidential numbering pattern, the digital copying machine masks the image data to output a blank sheet.

In addition, Japanese Laid-Open Patent Publication No. 2004-228897 discloses an image processing method of embedding a base pattern including copy permission information as a background image in advance and permitting to copy a document to the user who is decided based on a permission condition corresponding to the copy permission information, in a copying machine or the like.

As described above, information is embedded into a document and image processing is performed based on the embedded information, so that illegal copy of papers and the like can be prohibited.

However, if a document is copied plural times, information embedded into the document is degraded gradually. More specifically, if a document with the aforementioned information embedded thereinto is copied plural times, the embedded information to be recorded in a duplication is degraded. When the duplication with the degraded information embedded thereinto is further copied, there is a possibility that the information can not exert a function of prohibiting illegal copy due to degradation.

That is, in the conventional art, if a document is copied plural times, there is a possibility that illegal copy of the document can not be prohibited with certainty.

A technique for controlling image processing based on information embedded into papers is important for various purposes in addition to prohibition of illegal copy of papers and the like. Therefore, it is necessary to develop a technique for copying a document having information embedded thereinto and, also, to develop a technique for embedding information into a document.

The present invention is devised in view of the aforementioned circumstances. A first object of the present invention is to provide an image processing apparatus capable of avoiding the following disadvantage: when a document is copied repeatedly, a function of information embedded into the document is degraded in a duplication of the document, and a control method thereof A second object of the present invention is to provide an image processing apparatus capable of devising embedment of information into image data, thereby utilizing information embedded into a document with certainty, and a control method thereof.

SUMMARY OF THE INVENTION

According to one aspect of the present invention, an image processing apparatus includes a creation section for scanning an image of a document to thereby create image date, an extraction section for extracting specific code data from the image data created by the creation section, a deletion section for deleting pattern data corresponding to the specific code data extracted by the extraction section, from the image data created by the creation section, and an embedment section for embedding pattern data corresponding to the specific code data into the image data with the pattern data corresponding to the specific code data deleted therefrom by the deletion section.

According to another aspect of the present invention, a control method of an image processing apparatus includes a step of scanning an image of a document to thereby create image data, a step of extracting specific code data from the created image data, a step of deleting pattern data corresponding to the extracted specific code data, from the created image data, and a step of embedding pattern data corresponding to the specific code data into the image data with the pattern data corresponding to the specific code data deleted therefrom.

According to still another aspect of the present invention, an image processing apparatus includes a creation section for scanning an image of a document to thereby create image data, an extraction section for extracting specific code data from the image data created by the creation section, a control section for prohibiting embedment of pattern data into the image data created by the creation section when the extraction section extracts the specific code data, and permitting embedment of the pattern data into the image data created by the creation section when the extraction section fails to extract the specific code data, and an embedment section for embedding predetermined pattern data into the image data created by the creation section when the control section permits embedment of the pattern data.

According to yet another aspect of the present invention, a control method of an image processing apparatus for embedding predetermined pattern data into scanned image data to output the image data with the predetermined pattern data embedded thereinto includes a step of scanning an image of a document to thereby create image data, a step of extracting specific code data from the created image data, a step of embedding predetermined pattern data into the created image data when the specific code data fails to be extracted, and a step of prohibiting embedment of the predetermined pattern data into the created image data when the specific code data is extracted.

According to one and another aspects of the present invention, when specific code data is extracted from scanned image data, the specific code data is deleted from the image data and, instead, pattern data corresponding to the code data is newly embedded into the image data.

Thus, even when a document including specific code data is copied plural times, image data with code data newly embedded thereinto is outputted as a duplication every time the document is copied.

Accordingly, it is possible to avoid the following disadvantage: a document with specific code data embedded thereinto is copied plural times, so that the specific data can not sufficiently exert its function in a duplication.

According to still another and yet another aspects of the present invention, with the image processing apparatus, when an image of a document is scanned for copy or the like so that image data is created, predetermined pattern data constituted of code data and the like can be embedded into the image data. However, if specific code data is already embedded into the created image data, the image processing apparatus prohibits embedment of the predetermined pattern data.

With the image processing apparatus, thus, it is possible to avoid the following disadvantage: if a document with an image such as a base pattern embedded thereinto is to be copied, predetermined pattern data is further embedded into image data based on the document, so that the originally embedded image can not exert its inherent function. Accordingly, the image processing apparatus can utilize information embedded into a document with certainty.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1A:
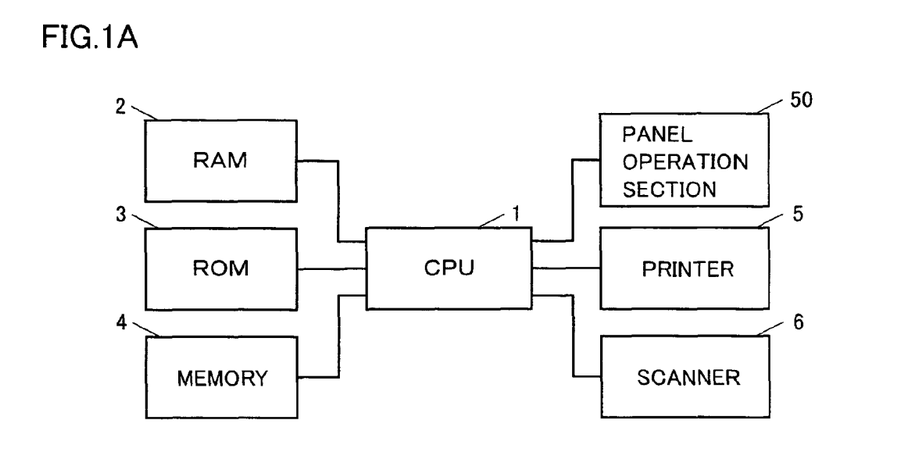
FIG. 1A shows a hardware configuration of an image processing apparatus according to a first embodiment of the present invention.
Figure 1B:
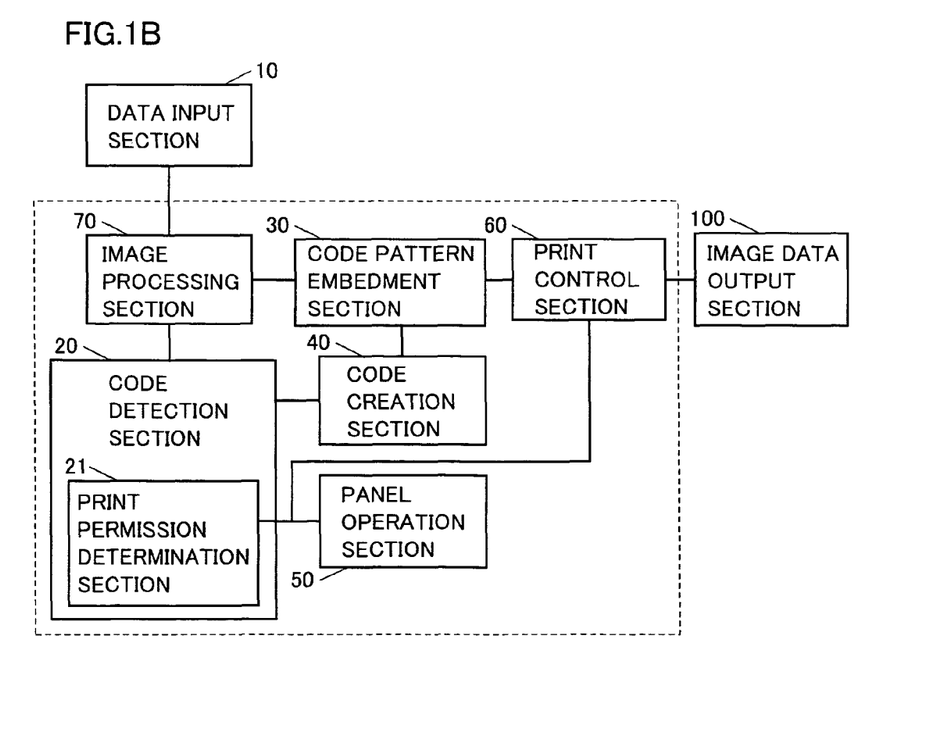
FIG. 1B is a control block diagram of the image processing apparatus.

FIGS. 1A and 1B respectively show a schematic configuration of an image processing apparatus according to a first embodiment of the present invention.

With reference to FIG. 1A, the image processing apparatus includes a CPU (Central Processing Unit) 1 for controlling a general operation of the image processing apparatus, a RAM (Random Access Memory) 2 for temporarily storing data, a ROM (Read Only Memory) 3 for storing a program, a constant and the like, a memory 4 for storing data in a rewritable manner, a panel operation section 50 for displaying information, a touch key operated by a user, and the like, a printer 5 for outputting an image, and a scanner 6 for scanning an image of a document to create image data.

With reference to FIG. 1B, the image processing apparatus also includes a data input section 10 having image data inputted thereto, an image processing section 70 for performing processing such as dilation (to be described later) on the image data inputted to data input section 10, a code detection section 20 for detecting a code pattern from the image data and detecting code data based on the code pattern, a code pattern embedment section 30 for embedding code data into the image data, a code creation section 40 for creating code data, a print control section 60 for controlling operations of panel operation section 50 and printer 5, and an image data output section 100 for printing the image data sent from print control section 60 on a sheet of paper to output the sheet of paper.

Code detection section 20 includes a print permission determination section 21 for determining whether to permit print of the image data inputted to data input section 10 or not, based on information corresponding to the code pattern detected by code detection section 20. Data input section 10 includes scanner 6 and image data output section 100 includes printer 5.

Code data is data embedded into a document in form of a base pattern or the like, and constitutes information recognized by the image processing apparatus. Specific description of the code data will be given later. In this embodiment, code data arranged with a predetermined pattern so as to correspond to predetermined information is referred to as a code pattern.

Figure 2:
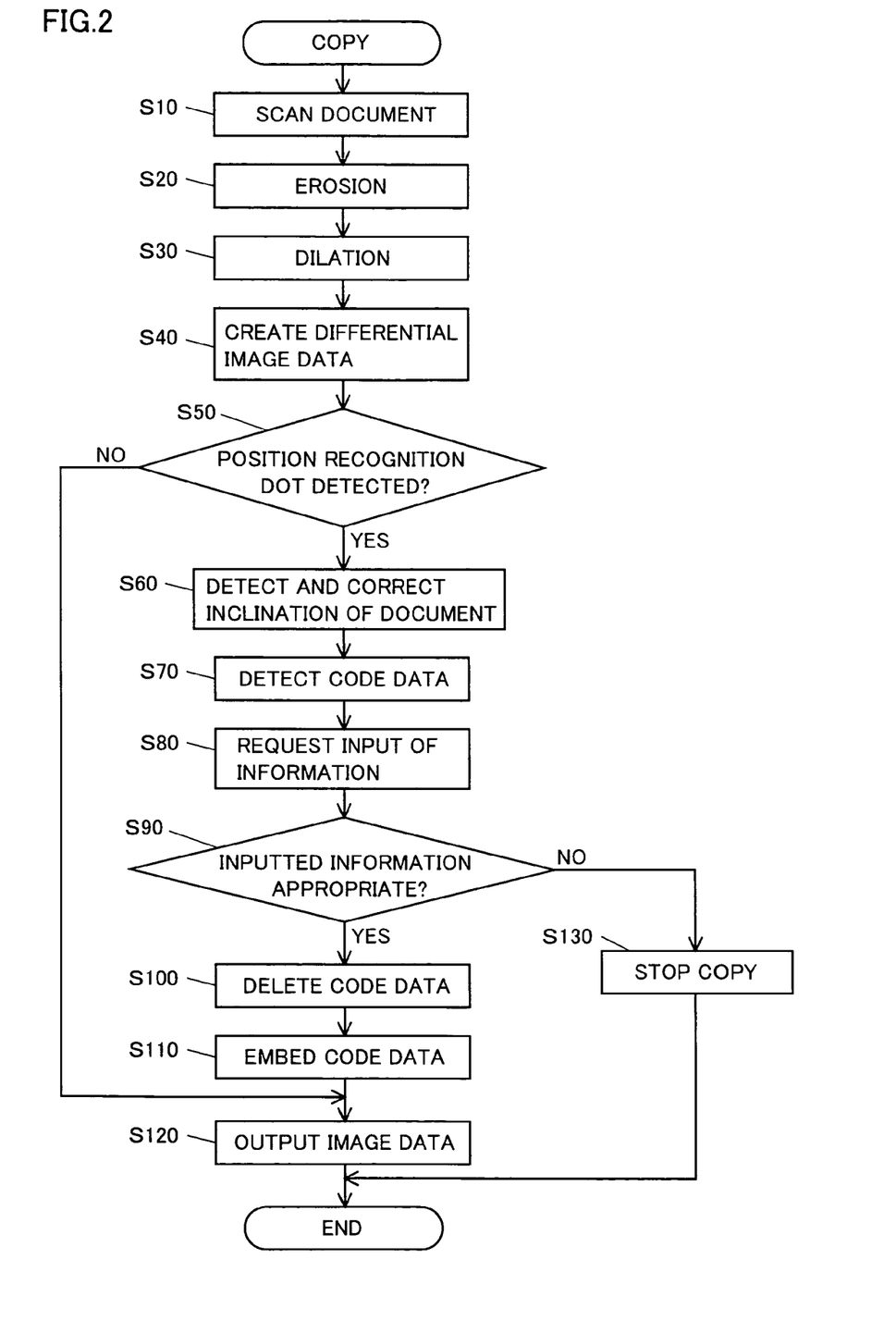
FIG. 2 is a flowchart of copy processing executed by the image processing apparatus shown in FIGS. 1A and 1B.

Next, description will be given of copy processing executed upon copying an image of a document in the image processing apparatus according to this embodiment with reference to FIG. 2.

In step S10, first, data input section 10 scans a document to thereby create image data. Then, the image data is inputted to image processing section 70.

In step S20, next, image processing section 70 performs filtration (erosion) using a filter having a contraction effect, on the image data created in step S 10.

In step S30, next, image processing section 70 performs filtration (dilation) using a filter having an expansion effect, on the image data subjected to the erosion in step S20. The erosion in step S20 and the dilation in step S30 are performed for creating differential image data in step S40.

More specifically, code data embedded into the document is deleted from the image data created in step S10 by the erosion in step S20. Further, the image data from which the code data is deleted in step S20 is subjected to the dilation in step S30, so that image data having no code data is obtained.

In step S40, next, image processing section 70 creates differential image data between the image data subjected to the dilation in step S30 and the image data created by data input section 10. The differential image data is stored in RAM 2 or memory 4.

In step S50, next, code detection section 20 detects a position recognition dot of the differential image data. The position recognition dot is on of the data that constitute code data. Herein, description will be given of code data.

Figure 3A:
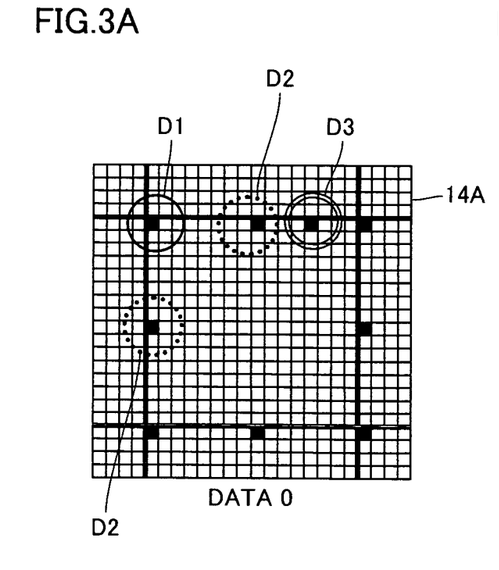
FIGS. 3A and 3B respectively show one example of a dot pattern recognized by the image processing apparatus shown in FIGS. 1A and 1B.

Code data contains a single data cell or a plurality of data cells. The data cells expresses a first dot pattern corresponding to a value of "0" or a second dot pattern corresponding to a value of "1". The first dot pattern and the second dot pattern contain a position recognition dot and a data expression dot, respectively. A position recognition dot indicates a reference position of each dot pattern, and includes a position expression dot and a position expression auxiliary dot. A data expression dot expresses a value of "0" or a value of "1" in each dot pattern. FIG. 3A shows one example of the first dot pattern and FIG. 3B shows one example of the second dot pattern.

Figure 3B:
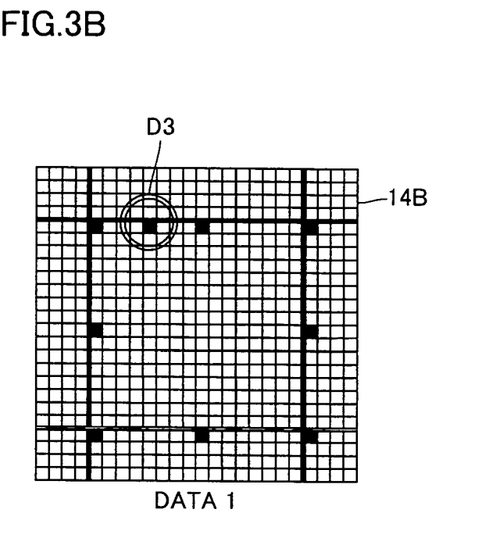

With reference to FIGS. 3A and 3B, each of a first dot pattern 14A and a second dot pattern 14B includes a binarization pattern of 16×16 pixels (hereinafter, referred to as "data cell"). On these patterns, a position expression dot D1 indicating a reference position is arranged at an upper left end. Herein, the reference position is used as a reference for determining a position of a data expression dot D3 (to be described later). When a code pattern is embedded into image data, position expression dots D1 are arranged in a vertical direction and a lateral direction at intervals of 16 pixels on an image to be outputted.

Position expression auxiliary dots D2 are arranged away from position expression dot D1 by eight pixels in a rightward direction and a downward direction, respectively. More specifically, data cells are repeatedly arranged according to a code pattern, so that position expression auxiliary dots D2 are arranged away from a position expression dot D1 by eight pixels in a vertical direction and a lateral direction, respectively.

Data 0 (see FIG. 3A) of first dot pattern 14A is different from data 1 (see FIG. 3B) of second dot pattern 14B in an arrangement position of a data expression dot D3.

If a data cell to be embedded has a resolution of 600 dpi, each side thereof is 16/600 inches (0.068 cm), which is very small. Thus, the data cell printed on a sheet of paper looks like a gray background image.

With reference to FIG. 2 again, in step S50, position recognition dots arranged in a vertical direction and a lateral direction at fixed intervals as described above are detected from the differential image data. If the position recognition dots are detected, the copy processing proceeds to step S60. On the other hand, if the position detection dots are not detected (if it is determined that the differential image data contains no position recognition dot), the copy processing proceeds to step S120.

In step S60, the position recognition dots detected in step S50 are used for detecting inclination of the differential image data (the document). Then, the differential image data is subjected to correction of the inclination.

Figure 4:
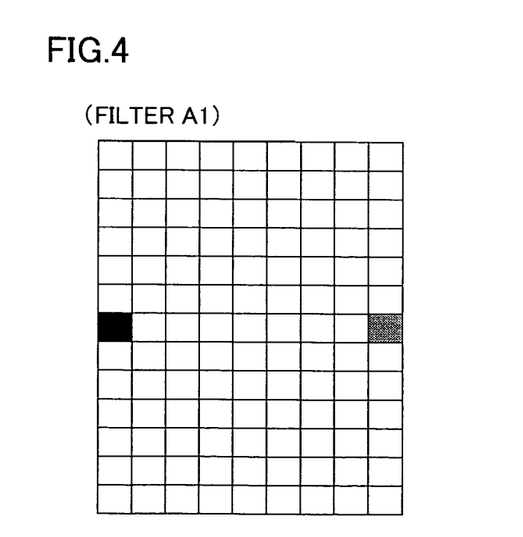
FIG. 4 shows one example of an inclination detection filter utilized in the image processing apparatus shown in FIGS. 1A and 1B.
Figure 5:
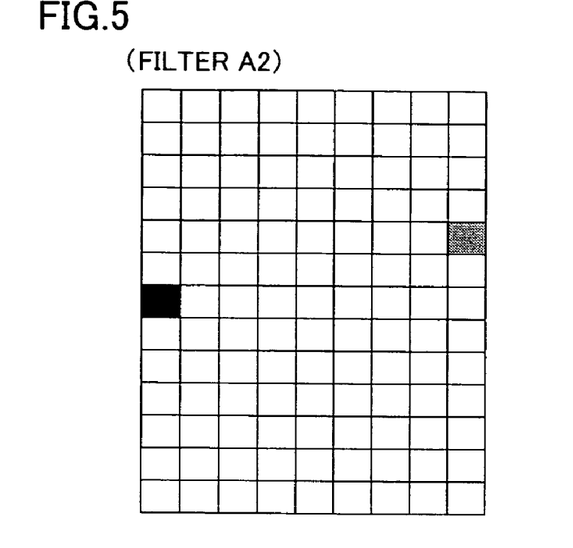
FIG. 5 shows another example of an inclination detection filter utilized in the image processing apparatus shown in FIGS. 1A and 1B.
Figure 6:
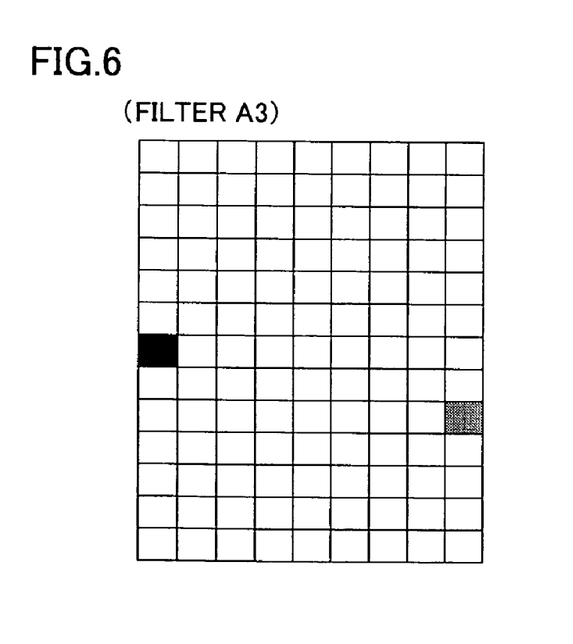
FIG. 6 shows still another example of an inclination detection filter utilized in the image processing apparatus shown in FIGS. 1A and 1B.

The inclination of the document is detected based on inclination detection filtration using a plurality of filters (inclination detection filters). FIGS. 4 to 6 respectively show one example of an inclination detection filter to be utilized herein. For example, ROM 3 stores data corresponding to such a filter.

FIGS. 4, 5 and 6 show filters A1, A2 and A3, respectively. A plurality of squares shown in each of the figures represent pixels, respectively. Each filter includes one black pixel and one gray pixel.

In the inclination detection filtration, the black pixel and the gray pixel in the inclination detection filter are targeted, and replacement of a black pixel is sequentially performed on all pixels at a maximum value. More specifically, if two pixels for use in filtration include dots in the differential image data, such pixels are blacked out. On the other hand, if the two pixels include no dot, such pixels are whited out (i.e., assimilate with a background image).

Then, a value obtained by subtracting each pixel value after filtration from "255" (i.e., a value indicating the number of black pixels) is added for all pixels, and the resultant is stored in RAM 2 or memory 4. Herein, this numerical value is referred to as an "inclination coincidence".

Then, each of the filters shown in FIGS. 4 to 6 is subjected to the inclination detection filtration. Thus, an inclination coincidence of each filter is calculated and stored. An inclination angle of a filter having the highest inclination coincidence corresponds with an inclination angle of the differential image data.

With reference to FIG. 2 again, in step S60, the inclination of the differential image data is detected and corrected. Thereafter, in step S70, code detection section 20 detects code data of the differential image data. This code data is detected by reading of information expressed by a data expression dot, based on the aforementioned position recognition dot. Specifically, information expressed by a data expression dot means information expressed by an arrangement pattern of the first dot pattern (see FIG. 3A) and an arrangement pattern of the second dot pattern (see FIG. 3B), for example. Therefore, code detection section 20 detects a code data based on the dot pattern (code pattern).

In step S80, next, a user receives a request to input information corresponding to the code data (hereinafter, referred to as "permission information") as information for permitting copy. A request herein means display of a message for encouraging the user to input permission information (or notification including another outputting method such as voice output). Specifically, panel operation section 50 displays a message requesting input of permission information, for example. In accordance with the message, for example, the user operates the touch key displayed on panel operation section 50 to thereby input permission information. CPU 1 can recognize the information inputted through the operation of panel operation section 50.

In step S90, next, print permission determination section 21 determines whether or not the information inputted by the user is appropriate. Herein, memory 4 stores code data (or details thereof) and permission information while associating them with each other. Then, print permission determination section 21 determines whether or not the information inputted by the user is permission information stored while being associated with code data to thereby determine whether or not the information inputted by the user is appropriate. Then, if it is determined that the information is appropriate, the copy processing proceeds to step S100. On the other hand, if it is determined that the information is not appropriate, the copy processing proceeds to step S 130.

In step S100, image processing section 70 deletes data constituting code data from the image data inputted in step S10. Then, the copy processing proceeds to step S110. Herein, code data to be deleted is, for example, the code data detected in step S70.

In step S110, next, code pattern embedment section 30 embeds code data corresponding to information equal to the information deleted in step S100 into the image data from which the code data is deleted in step S100. Then, the copy processing proceeds to step S120. Herein, code data to be embedded is created by code creation section 40.

In step S120, image data output section 100 outputs the data into which the code data is embedded in step S110. Thus, the copy processing ends. Herein, data outputted in step S120 is the image data which is inputted to image processing section 70 in step S10, from which the differential image data is deleted, and into which the code data detected from the differential image data is embedded.

In step S130, on the other hand, an operation for copying an image of a document is stopped. Thus, the copy processing ends.

In the aforementioned embodiment, code data is detected from differential image data corresponding to image data of a document. If such code data is detected, code data is detected from the image data inputted to data processing section 70 through data input section 10. After deletion of the detected code data, data corresponding to the deleted code data is newly embedded into the image data.

With this operation, if a document with code data embedded therein is to be copied, the image processing apparatus deletes the code data from image data of the document once and, then, newly embeds code data into the image data. Accordingly, even when the document is copied plural times, code data in a duplication is not degraded.

Second Embodiment

A configuration of an image processing apparatus according to a second embodiment of the present invention can be made similar to that of the image processing apparatus according to the first embodiment; therefore, specific description thereof will not be repeated.

The image processing apparatus according to this embodiment is different from the image processing apparatus according to the first embodiment in the following point: copy processing is partly changed. Hereinafter, description will be mainly given of such a change.

Figure 7:
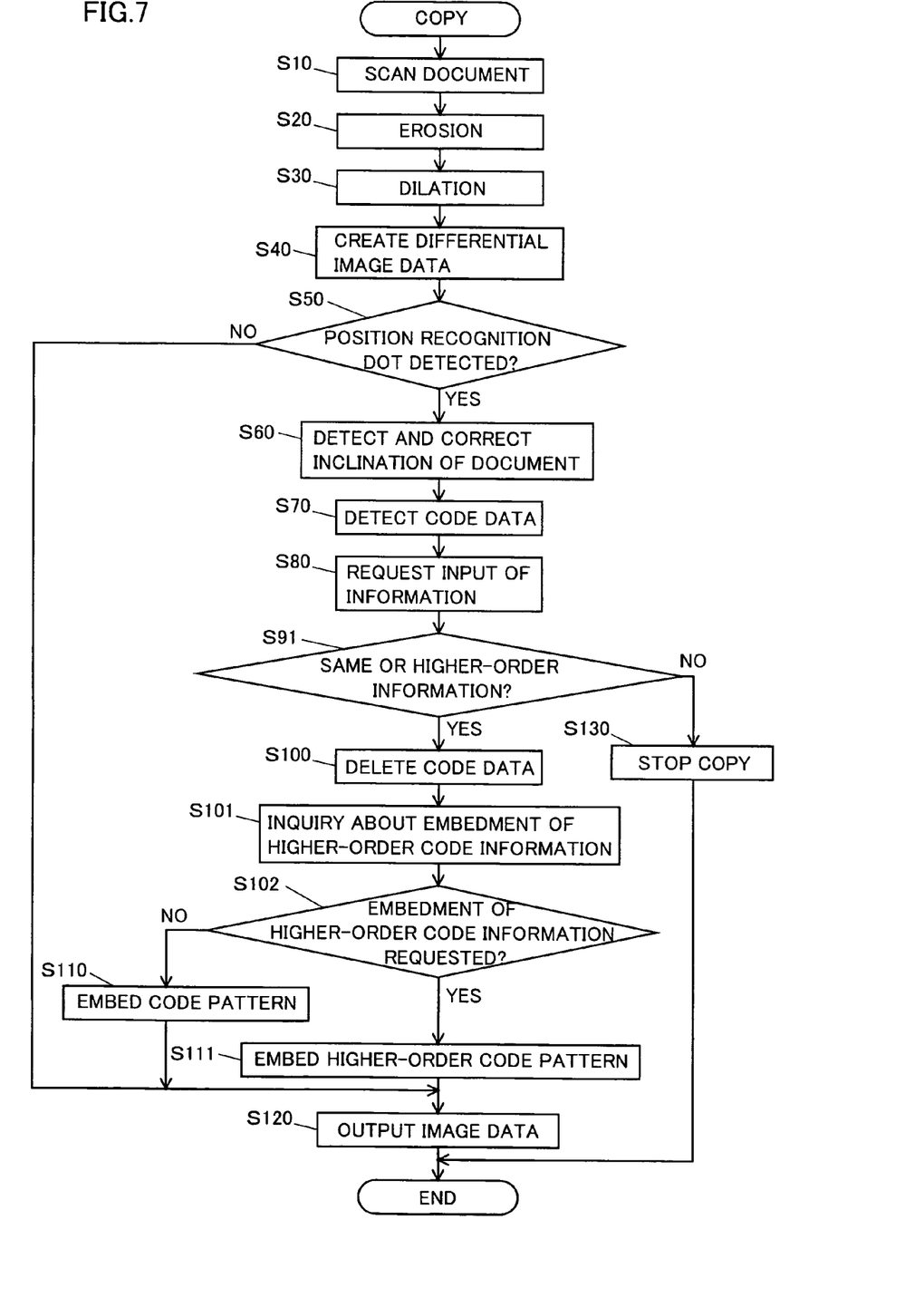
FIG. 7 is a flowchart of copy processing executed by an image processing apparatus according to a second embodiment of the present invention.

FIG. 7 is a flowchart of copy processing executed by the image processing apparatus according to this embodiment.

With reference to FIG. 7, in the copy processing in this embodiment, steps S10 to S80 are similar to those in the first embodiment. That is, in the copy processing in this embodiment, image data created from a document is subjected to erosion and dilation, so that differential image data is created. Then, a position recognition dot is detected, inclination of the document is corrected, code data is detected, and a user receives a request to input permission information.

In step S80, the user receives a request to input permission information. Then, in step S91, the image processing apparatus determines whether information inputted by the user is permission information stored while being associated with the code data detected in step S70 or information stored as information higher in order than the permission information. More specifically, in this embodiment, permission information inputted by a user for output of image data has hierarchy. If it is determined the information inputted by the user is the aforementioned information, the copy processing proceeds to step S100. If not, an operation for copying the document is stopped in step S130; thus, the copy processing ends.

In step S100, as in the first embodiment, the code data detected in step S70 is deleted from the image data inputted in step S10. Then, the copy processing proceeds to step S101.

In step S101, the user receives an inquiry about embedment, into the data from which the code data is deleted in step S100, of code data corresponding to information higher in order than the code data deleted in step S100. Specifically, panel operation section 50 displays a message encouraging the user to input information about whether he/she makes a request about such embedment, for example.

In step S102, next, details of the information inputted by the user are checked. If the user makes a request to embed code data corresponding to higher-order information, the copy processing proceeds to step S111. If not, the copy processing proceeds to step S110.

In step S110, as in the first embodiment, code data equal to the code data deleted in step S100 is embedded into the image data from which the code data is deleted in step S100. Then, the copy processing proceeds to step S120.

In step S111, on the other hand, code data corresponding to information higher in order than the information to which the deleted code data corresponds is embedded into the data from which the code data is deleted in step S100. Then, the copy processing proceeds to step S120. Herein, "higher-order" means that security level is high, for example. It is to be noted that code data to be embedded into a document has security level higher than that of code data already embedded into the document, so that the number of users who are permitted to copy the document is further restricted.

In step S120, as in the first embodiment, image data output section 100 outputs an image corresponding to the image data embedded the code data in step S110 or step S111. Thus, the copy processing ends.

In the aforementioned embodiment, information to which code data corresponds has hierarchy. If a document is to be copied, code data higher in order than code data already embedded into the document is embedded into a duplication according to a user's request.

Third Embodiment

A configuration of an image processing apparatus according to a third embodiment of the present invention can be made similar to that of the image processing apparatus according to the first embodiment; therefore, specific description thereof will not be repeated.

The image processing apparatus according to this embodiment is different from the image processing apparatus according to the first embodiment in the following point: copy processing is partly changed. Hereinafter, description will be mainly given of such a change.

Figure 8:
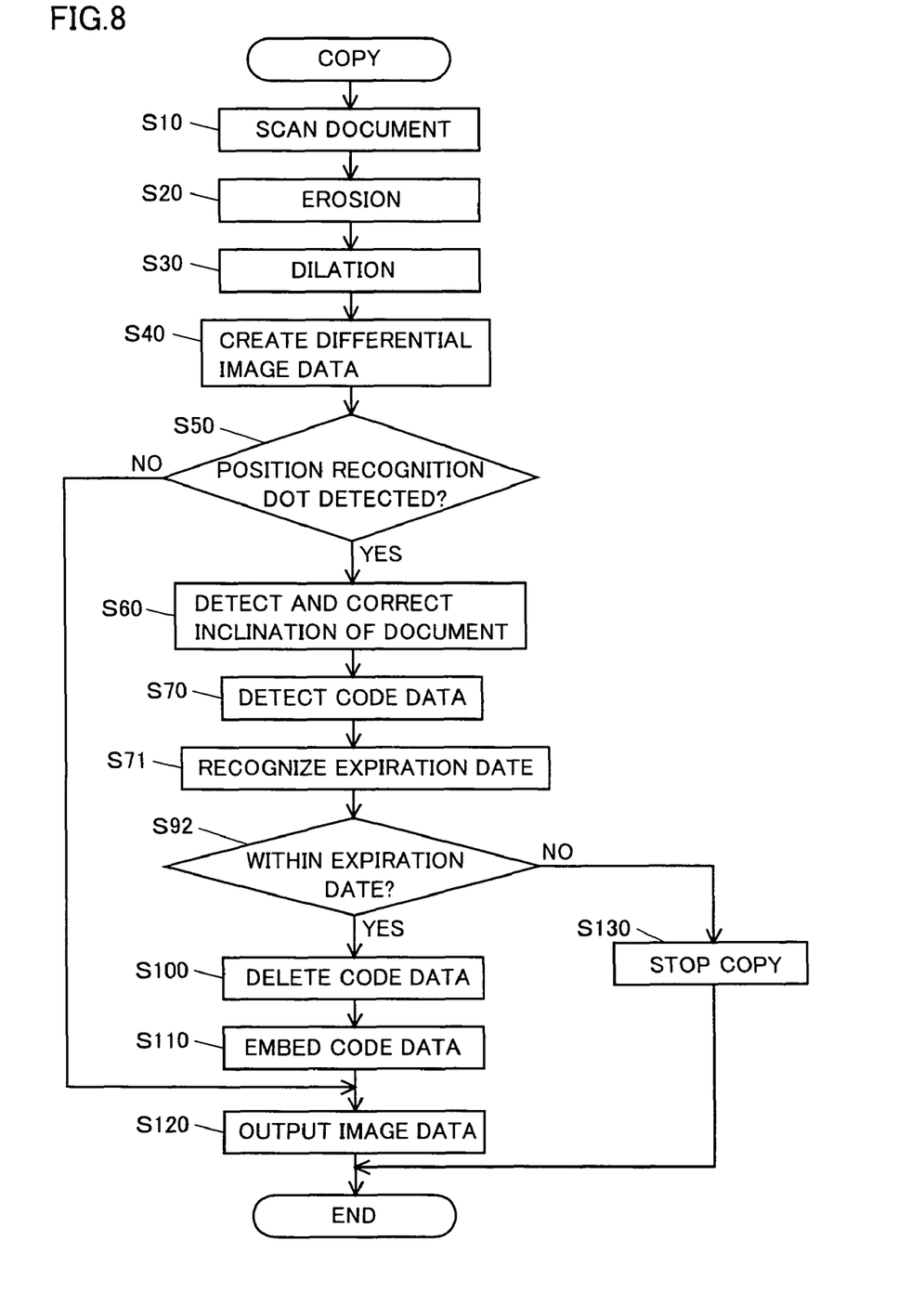
FIG. 8 is a flowchart of copy processing executed by an image processing apparatus according to a third embodiment of the present invention.

FIG. 8 is a flowchart of copy processing executed by the image processing apparatus according to this embodiment.

With reference to FIG. 8, in the copy processing in this embodiment, steps S10 to S70 are similar to those in the first embodiment. That is, in the copy processing in this embodiment, image data created from a document is subjected to erosion and dilation, so that differential image data is created. Then, a position recognition dot is detected, inclination of the document is corrected, and code data is detected.

In step S70, the code data is detected. Then, in step S71, code detection section 20 recognizes an expiration date of copy of the document corresponding to the detected code data in the image processing apparatus. Specifically, in the image processing apparatus according to this embodiment, ROM 3 or memory 4 stores information for associating the code data with information specifying the expiration date of copy. Then, code detection section 20 reads the expiration date associated with the code data detected in step S70 from this information to thereby recognize the expiration date corresponding to the detected code data.

In step S80, next, print permission determination section 21 determines whether or not a moment of execution of step S80 is within the expiration date recognized in step S71. If the moment is within the expiration date, the copy processing proceeds to step S100. If not, the copy processing proceeds to step S130. CPU 1 in this embodiment incorporates a timer therein. In step S80, it is determined whether or not current date and time obtained by the timer is within the aforementioned expiration date.

In step S100, as in the first embodiment, the code data detected in step S70 is deleted from the image data inputted in step S10. Then, the copy processing proceeds to step S110.

In step S110, as in the first embodiment, code data equal to the code data deleted in step S100 is embedded into the image data from which the code data is deleted in step S100. Then, the copy processing proceeds to step S120.

In step S120, as in the first embodiment, image data output section 100 outputs an image corresponding to the image data into which the code data is embedded in step S110. Thus, the copy processing ends.

In step S130, on the other hand, an operation for copying an image of the document is stopped. Thus, the copy processing ends.

In the aforementioned embodiment, ROM 3 or memory 4 storing information for associating code data with information specifying an expiration date of copy configures an information storage section for storing specific code data while associating the code data with an expiration date.

In the aforementioned embodiment, code data corresponds to an expiration date of copy. The image processing apparatus automatically determines whether or not copy is executable.

Fourth Embodiment

A configuration of an image processing apparatus according to a fourth embodiment of the present invention can be made similar to that of the image processing apparatus according to the first embodiment; therefore, specific description thereof will not be repeated.

The image processing apparatus according to this embodiment is different from the image processing apparatus according to the first embodiment in the following point: copy processing is partly changed. Hereinafter, description will be mainly given of such a change.

Figure 9:
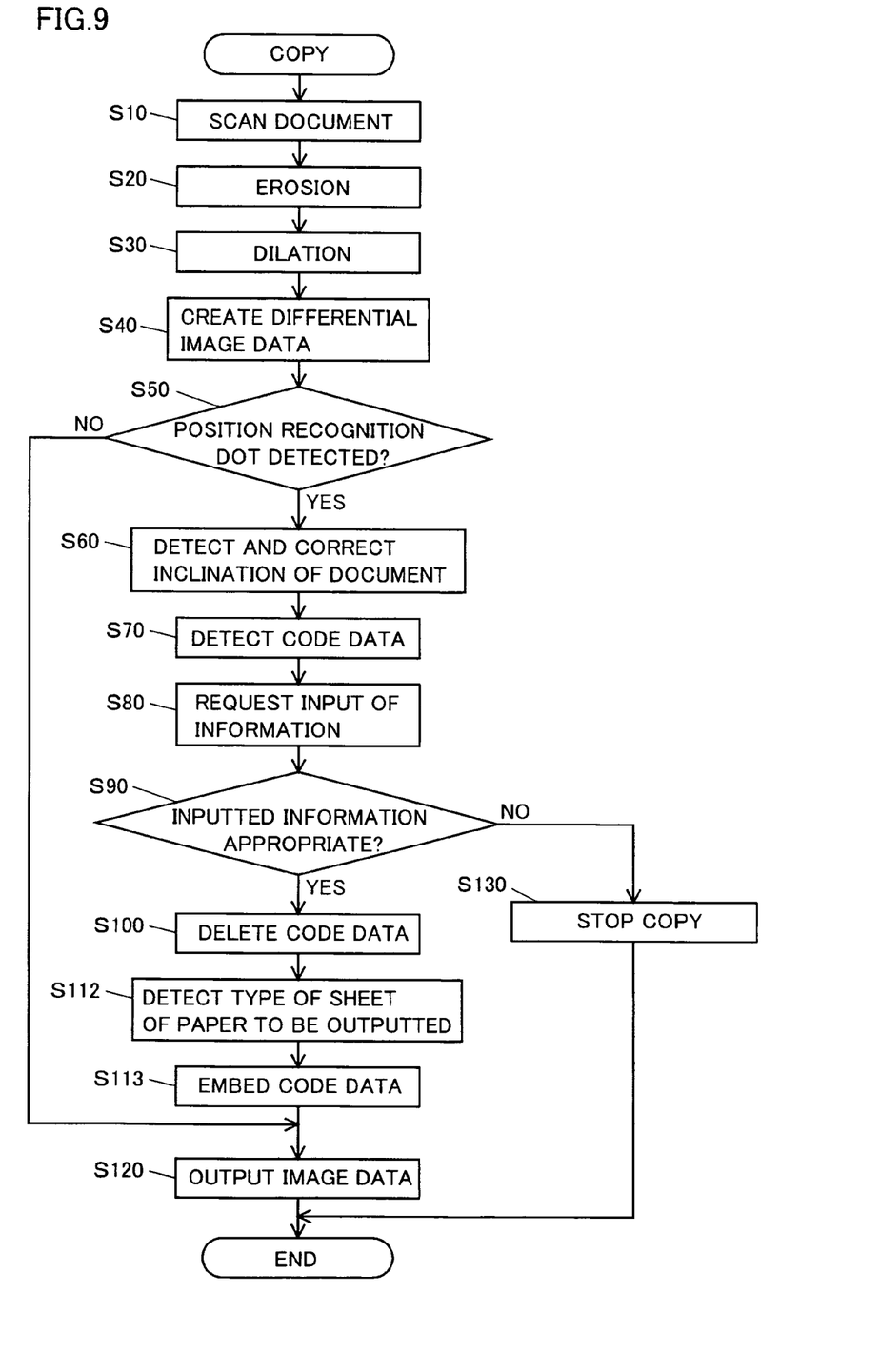
FIG. 9 is a flowchart of copy processing executed by an image processing apparatus according to a fourth embodiment of the present invention.

FIG. 9 is a flowchart of copy processing executed by the image processing apparatus according to this embodiment.

With reference to FIG. 9, in the copy processing in this embodiment, steps S10 to S100 are similar to those in the first embodiment. That is, in the copy processing in this embodiment, image data created from a document is subjected to erosion and dilation, so that differential image data is created. Then, a position recognition dot is detected, inclination of the document is corrected, code data is detected, and a user receives a request to input permission information. In step S80, the user receives a request to input permission information. Thereafter, in step S90, if the image processing apparatus determines that appropriate information is inputted as permission information, the copy processing proceeds to step S100. On the other hand, if the image processing apparatus determines that appropriate information is not inputted as permission information, the copy processing proceeds to step S130. In step 130, an operation for copying an image of the document is stopped. Thus, the copy processing ends. In step S100, on the other hand, code data detected in step S70 is deleted from the image data inputted in step S10. Then, the copy processing proceeds to step S112.

In step S112, the image processing apparatus detects a type of a sheet of paper to be outputted as a duplication of the document. An example of the detection of the type of the sheet of paper to be outputted may include the detection of a size of the sheet of paper. In the image processing apparatus, a sheet of paper to be used herein has a size equal to that of the document basically. However, such a size is determined based on information inputted by the user through panel operation section 50 in some cases.

In step S113, code data corresponding to information equal to the information to which the code data deleted in step S100 corresponds is embedded into the image data which is inputted in step S10 and from which the code data is deleted in step S100, in the image processing apparatus. Then, the copy processing proceeds to step S120.

In step S113, code pattern embedment section 30 embeds a code pattern. The code pattern to be embedded by code pattern embedment section 30 in step S113 is created by code creation section 40. Also in step S113, code creation section 40 modifies a rule for embedment of code data in accordance with a type of a sheet of paper to be outputted.

For example, in a case where code data is arranged on a document in a certain direction over a certain length and a dimension of a sheet of paper to be outputted, corresponding to the direction, is less than the length, a return position of the code data is modified such that the length of the code data arranged in the direction becomes not more than the dimension of the sheet of paper to be outputted.

In step S120, image data output section 100 outputs data into which the code data is embedded in step S113. Thus, the copy processing ends.

In the aforementioned embodiment, through execution of steps S112 and S113, code data to be embedded is modified so as to respond to a type of a sheet of paper to be outputted as a result of copy.

Fifth Embodiment

Figure 10A:
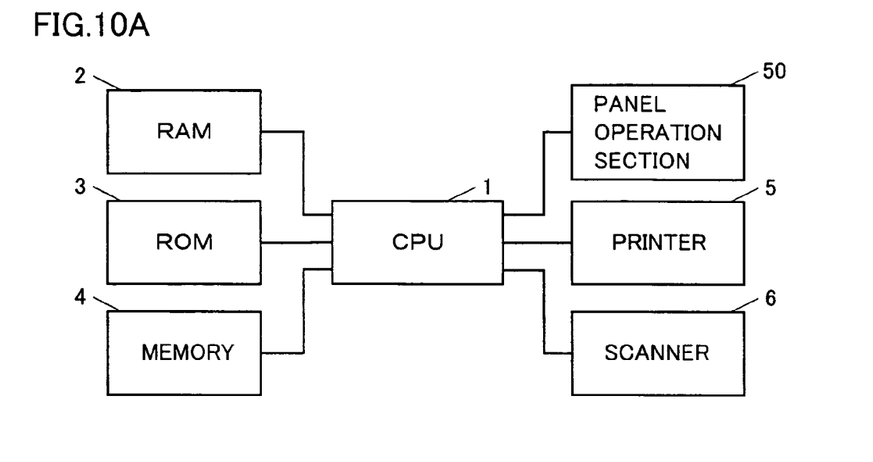
FIG. 10A shows a hardware configuration of an image processing apparatus according to a fifth embodiment of the present invention.
Figure 10B:
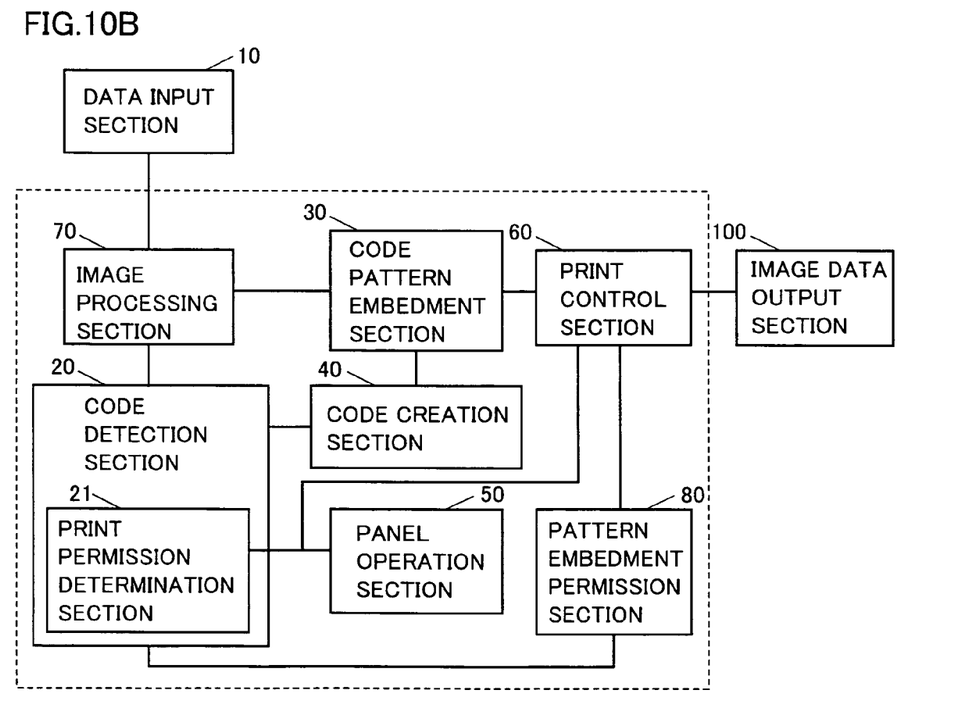
FIG. 10B is a control block diagram of the image processing apparatus.

FIGS. 10A and 10B respectively show a schematic configuration of an image processing apparatus according to a fifth embodiment of the present invention.

With reference to FIG. 10A, a hardware configuration of the image processing apparatus according to this embodiment is equal to that of the image processing apparatus according to the first embodiment.

With reference to FIG. 10B, the image processing apparatus according to this embodiment includes data input section 10, image processing section 70, code detection section 20, code pattern embedment section 30, code creation section 40, panel operation section 50, print control section 60 and image data output section 100. The image processing apparatus also includes a pattern embedment permission section 80 for permitting/prohibiting embedment of (an image pattern corresponding to) code data into image data.

Figure 11:
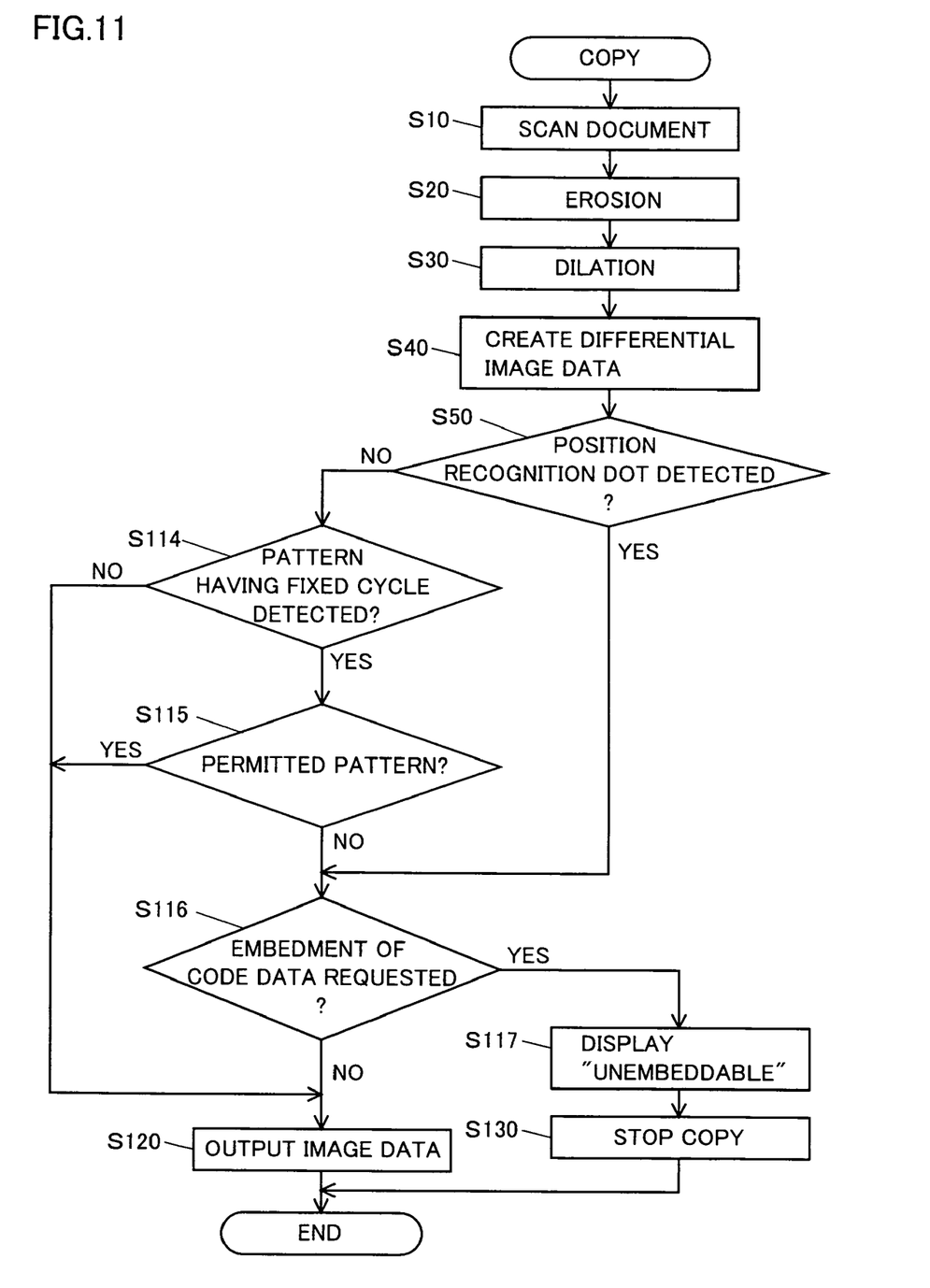
FIG. 11 is a flowchart of copy processing executed by the image processing apparatus shown in FIGS. 10A and 10B.

FIG. 11 is a flowchart of copy processing executed upon copying an image of a document by the image processing apparatus according to this embodiment.

In the copy processing in this embodiment, steps S10 to S50 are similar to those in the first embodiment. That is, in the copy processing in this embodiment, image data created from a document is subjected to erosion and dilation, so that differential image data.

In step S50, the differential image data is subjected to detection of position recognition dots arranged in a vertical direction and a lateral direction at fixed intervals as described above. If the position recognition dot is detected, the copy processing proceeds to step S116. If the position recognition dot is not detected (if it is determined that the differential image data contains no position recognition dot), the copy processing proceeds to step S114.

In step S114, code detection section 20 determines whether or not an image pattern having a fixed cycle is detected in the differential image data. Such detection is executed based on whether or not a concentration of an image on a predetermined line is detected in the differential image data and the image exhibits a comparatively high concentration value at a fixed cycle. Then, if it is determined that the image pattern having the fixed cycle is detected, the copy processing proceeds to step S115. On the other hand, if it is determined that the image pattern having the fixed cycle is not detected, the copy processing proceeds to step S120.

In step S115, code detection section 20 determines whether or not the image pattern detected in step S114 is an image pattern to which embedment of code data is permitted. If it is determined that the detected image pattern is permitted, the copy processing proceeds to step S120. On the other hand, if it is determined that the detected image pattern is not permitted, the copy processing proceeds to step S116. Herein, an image pattern to which embedment of code data is permitted is an image pattern corresponding to a serial number or a page number placed in a part of a page (a number placed in a specific portion of a page or numbers located in identical positions in a document of plural pages), a date, or a watermark. Information for specifying such an image pattern is stored in code detection section 20. If the image pattern detected in step S114 is such an image pattern, even when code data (or a base pattern) is embedded, there is a low possibility that code data (or a base pattern) embedded while being overlapped with the aforementioned code data (the image pattern detected in step S114) loses its inherent function. In this embodiment, therefore, embedment of code data is permitted in such a case.

In step S116, pattern embedment permission section 80 determines whether or not a user inputs information about a request of the aforementioned embedment of code data. The user inputs this information through, for example, panel operation section 50. The inputted information is stored in RAM 2 or memory 4. Pattern embedment permission section 80 makes a determination in step S116 based on whether or not RAM 2 or memory 4 stores such information. If it is determined that the user inputs the information about a request of the aforementioned embedment, the copy processing proceeds to step S117. On the other hand, if it is determined that the user does not input such information, the copy processing proceeds to step S120.

In step S120, image data output section 100 outputs an image corresponding to the image data inputted to image processing section 70 in step S10. Thus, the copy processing ends. In step S120, print control section 60 adjusts image data to be outputted from image data output section 100 based on whether or not the user inputs information about a request of embedment of code data. More specifically, if the user inputs such information, print control section 60 allows image data output section 100 to output data obtained in such a manner that code data is embedded by code pattern embedment section 30 into the image data inputted through data input section 10. On the other hand, if the user does not input such information, print control section 60 allows image data output section 100 to output image data inputted through data input section 10 without embedment of code data by code pattern embedment section 30.

In step S117, on the other hand, panel operation section 50 displays a fact that embedment of code data is impossible. Then, the copy processing proceeds to step S130. Herein, as long as panel operation section 50 makes a notification that embedment of code data is impossible, a method of notification may be voice output in addition to the display.

In step S130, an operation for copying an image of the document is stopped. Thus, the copy processing ends.

In the aforementioned embodiment, image pattern is detected from differential image data corresponding to image data of a document.

If the image pattern is detected and a user makes a request of embedment of the code data, the user receives a fact that embedment is impossible. Then, processing ends without copying a document.

Thus, even when a document with code data already embedded thereinto is to be copied, it is possible to avoid a disadvantage that code data embedded into a duplication while being overlapped with the original code data can not exert its inherent function.

Even when a position recognition dot is not detected in differential image data, if an image pattern having a fixed cycle is detected, similarly, a user receives a fact that embedment is impossible on condition that the user makes a request of embedment of code data. Then, processing ends without copying a document.

Thus, it is possible to avoid the following disadvantage: when a document into which code data itself is not embedded, but an image pattern such as a base pattern is embedded is to be copied, code data is embedded into a duplication and is printed while being overlapped with the base pattern, so that both the base pattern and the code data can not exert their inherent functions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
  a creation section for scanning an image of a document to thereby create image date;
  an extraction section for extracting specific code data from the image data created by said creation section;
  a deletion section for deleting pattern data corresponding to said specific code data extracted by said extraction section, from the image data created by said creation section; and
  an embedment section for embedding pattern data corresponding to said specific code data into the image data with the pattern data corresponding to said specific code data deleted therefrom by said deletion section;
  an output section for outputting the image data;
  an output control section for permitting/prohibiting said output section to output/from outputting the image data, wherein when said extraction section extracts said specific code data, said output control section permits said output section to output the image data only in establishment of a predetermined condition;
  a storage section for storing said specific code data and an expiration date while associating said specific code data with the expiration date; and
  a timer, wherein
  when current date and time measured by said timer is within the expiration date stored in said storage section while being associated with said specific code data, said output control section determines that said predetermined condition is established.

2. The image processing apparatus according to claim 1, further comprising:
an input section for accepting input of information; and
a storage section for storing said specific code data and the information inputted to said input section while associating said specific code data with the information inputted to said input section, wherein
when said input section receives the information associated with said specific code data, said output control section determines that said predetermined condition is established.

3. The image processing apparatus according to claim 1, further comprising:
a notification section for making a notification that said output control section prohibits said output section from outputting the image data.

4. A control method of an image processing apparatus comprising:
scanning an image of a document to thereby create image data;
extracting specific code data from said created image data;
deleting pattern data corresponding to said extracted specific code data, from said created image data; and
embedding pattern data corresponding to said specific code data into the image data with the pattern data corresponding to said specific code data deleted therefrom;
permitting output of the image data only in establishment of a predetermined condition, in a case where said specific code data is successfully extracted;
storing said specific code data and an expiration date while associating said specific code data with the expiration date;
measuring current date and time, wherein
when said measured current date and time is within the expiration date stored while being associated with said specific code data, it is determined that said predetermined condition is established.

5. The control method of an image processing apparatus according to claim 4, further comprising the steps of:
accepting input of information; and
storing said specific code data and the information inputted while associating said specific code with the information inputted externally, wherein
when said information inputted is the information associated with said specific code data, it is determined that said predetermined condition is established.

6. The control method of an image processing apparatus according to claim 4, further comprising the step of:
making a notification that output of the image data is prohibited.

7. An image processing apparatus comprising:
a creation section for scanning an image of a document to thereby create image data;
an extraction section for extracting specific code data from the image data created by said creation section;
a control section for prohibiting embedment of pattern data into the image data created by said creation section when said extraction section extracts said specific code data, and permitting embedment of the pattern data into the image data created by said creation section when said extraction section fails to extract said specific code data; and
an embedment section for embedding predetermined pattern data into the image data created by said creation section when said control section permits embedment of the pattern data;
a detection section for detecting whether or not the image data created by said creation section contains an image pattern having a fixed cycle, wherein
when said detection section detects said image pattern having the fixed cycle, said control section prohibits embedment of the pattern data into the image data created by said creation section.

8. The image processing apparatus according to claim 7, further comprising:
a notification section for making a notification that said control section prohibits embedment of the pattern data into the image data created by said creation section.

9. A control method of an image processing apparatus for embedding predetermined pattern data into scanned image data to output the image data with the predetermined pattern data embedded thereinto, the control method comprising:
scanning an image of a document to thereby create image data;
extracting specific code data from said created image data;
embedding predetermined pattern data into said created image data when said specific code data fails to be extracted; and
prohibiting embedment of the predetermined pattern data into said created image data when said specific code data is extracted;
detecting whether or not said created image data contains an image pattern having a fixed cycle, wherein
said prohibition step prohibits embedment of said predetermined pattern data when said image pattern having the fixed cycle is detected.

10. The control method of an image processing apparatus according to claim 9, further comprising the step of:
making a notification that the embedment of said pattern data is prohibited.

* * * * *